(12) United States Patent
Horvitz et al.

(10) Patent No.: US 10,540,665 B2
(45) Date of Patent: Jan. 21, 2020

(54) REFERRAL-BASED SPONSORSHIP OF ACCESS TO CONTENT ITEM SETS

(75) Inventors: Eric Horvitz, Kirkland, WA (US); Kamal Jain, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 1427 days.

(21) Appl. No.: 12/490,413

(22) Filed: Jun. 24, 2009

(65) Prior Publication Data
US 2010/0332488 A1 Dec. 30, 2010

(51) Int. Cl.
G06Q 30/02 (2012.01)
G06F 16/41 (2019.01)
G06F 16/958 (2019.01)

(52) U.S. Cl.
CPC ............ *G06Q 30/02* (2013.01); *G06F 16/41* (2019.01); *G06F 16/958* (2019.01)

(58) Field of Classification Search
CPC .. G06F 21/6218; G06F 21/6227; G06Q 10/10
USPC ........................................................ 707/783
See application file for complete search history.

(56) References Cited

U.S. PATENT DOCUMENTS

| | | | |
|---|---|---|---|
| 6,457,005 B1* | 9/2002 | Torrey | |
| 6,704,797 B1* | 3/2004 | Fields et al. | 709/246 |
| 7,788,686 B1* | 8/2010 | Andrews | G06Q 30/02 709/217 |
| 8,005,713 B1* | 8/2011 | Sanz-Pastor | B01D 50/002 705/14.1 |
| 2003/0233278 A1* | 12/2003 | Marshall | 705/14 |

(Continued)

FOREIGN PATENT DOCUMENTS

| | | |
|---|---|---|
| WO | 2006076424 A2 | 7/2006 |
| WO | 2007138556 A2 | 12/2007 |

OTHER PUBLICATIONS

Fournier,Johannes, "Providing and Accessing Scientific Literature. How the German Research Foundation (DFG) Supports Scholarly Communication", Information Services & Use 26 (2006) 147-150, http://iospress.metapress.com/content/5wjqu7hkgjhgvrh2/fulltext.pdf.

(Continued)

*Primary Examiner* — Charles D Adams
(74) *Attorney, Agent, or Firm* — Alleman Hall Creasman & Tuttle LLP

(57) ABSTRACT

A content provider may provide public access to a content item set, but may be unable to achieve sufficient revenue to sustain the administrative costs and ongoing development of the content item set. Instead, the content provider may develop relationships with one or more referrers (e.g., search engines.) When a user requests a content item, the content provider may determine whether the request results from a referral by a sponsoring referrer, and based on this determination may provide either a full version or a limited version of the content item. The referrer benefits by providing its users with free access to the content item set, which may be unavailable from non-sponsoring competitors, and in exchange may share advertising revenue with the content provider. This arrangement achieves sustaining sponsorship of the content provider while extending full and free access to the content item set to users of sponsoring referrers.

20 Claims, 8 Drawing Sheets

(56) References Cited

U.S. PATENT DOCUMENTS

| | | |
|---|---|---|
| 2005/0108031 A1 | 5/2005 | Grosvenor |
| 2005/0229220 A1* | 10/2005 | Fisher ................. H04N 7/17318 725/89 |
| 2006/0085750 A1* | 4/2006 | Easton et al. ................. 715/708 |
| 2006/0098900 A1 | 5/2006 | King et al. |
| 2007/0050194 A1 | 3/2007 | Maxey |
| 2007/0061197 A1* | 3/2007 | Ramer et al. ................... 705/14 |
| 2007/0124781 A1* | 5/2007 | Casey ................. H04N 7/17318 725/94 |
| 2007/0179845 A1 | 8/2007 | Jain |
| 2008/0046315 A1* | 2/2008 | Axe ....................... G06Q 30/02 705/14.54 |
| 2008/0114651 A1 | 5/2008 | Jain et al. |
| 2008/0172315 A1* | 7/2008 | Farouki ................. G06Q 40/00 705/35 |
| 2008/0177588 A1* | 7/2008 | Abbott ................... G06Q 30/02 709/224 |
| 2009/0106393 A1* | 4/2009 | Parr ................... H04L 63/0428 709/218 |
| 2010/0057576 A1* | 3/2010 | Brodersen .......... G06Q 30/0273 705/14.69 |

OTHER PUBLICATIONS

"Scientific Publication: Policy on Open Access", Dec. 2006, http://ec.europa.eu/research/eurab/pdf/eurab_scipub_report_recomm_dec06_en.pdf.

Björk, Bo-Christer, "Open Access to Scientific Publications—An Analysis of the Barriers to Change?", vol. 9 No. 2, Jan. 2004, http://informationr.net/ir/9-2/paper170.html.

* cited by examiner

REFERRAL-BASED SPONSORSHIP OF ACCESS TO CONTENT ITEM SETS

BACKGROUND

Many scenarios in the field of computing, and particularly on the worldwide web, involve the preparation of a set of content items, such as new stories, articles, data sets, media objects, and applications. A source of a content item set (e.g., a generator, aggregator, or distributor of such content items) may provide public access to at least a portion of the content item set, but may endeavor to recoup the costs of the provision. In some scenarios, the costs may be recouped by charging requesters to access some content items (either on a per-item basis or as a subscription to the content item set) or by providing a limited version of a content item to the requester and offering to provide a full version of the content item upon receiving payment from the requester. A "micropayment" system may also be implemented to encourage a steady stream of small payments from users. In other scenarios, the content provider may recoup the costs of the provision from advertisers, and may enable advertisers to deliver advertisements to the requesters in relation to the requests for the content items (e.g., by embedding an advertisement in the content item.) In still other scenarios, the content provider may offer value-added services in relation to the content items, and may advertise the value-added services to requesters while presenting the related content items. The revenue from such techniques may be used to sustain the provision of the service to the public.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The efforts of a content provider may endeavor to recoup costs may be complicated by many factors. Requesters may be disinclined to pay for content items, especially for content items that may be of unknown or temporary value to the requester (e.g., content items encountered by a requester during a casual browsing session.) In particular, micropayment systems are often disregarded by a large proportion of visitors. Also, many requesters may wholly disregard advertisements, resulting in little returned revenue from impression, "click-through" instances, and/or downstream purchases of advertised goods and services. These limitations may be especially difficult for providers of academic content items, such as scientific journals, who may be compelled to provide widespread and public access to the content items within a content item set. The provision of such content items to the public may be unsustainable without a mechanism for recouping operating expenses.

However, some types of referral services, in particular search engines, have developed successful revenue models through advertising and other techniques. Moreover, search engines attract visitors and receive such revenue by indexing content items of other providers, such as news outlets and media producers. While some content item sets have endeavored to exclude the indexing of the content items by such referrers, such exclusions often diminish demand for the content item set if visitors are less aware of or unable to locate the content item set, thereby further reducing the opportunities for the content provider to receive sustaining funds.

It may be feasible to recoup the operating costs of provided content items from referrers, such as search engines. The content provider may establish sponsorship relations with various referrers (such as search engines), and may provide the full version of a requested content item to the requester upon determining that the request and/or the requester was referred by a sponsoring referrer. In exchange, the sponsoring referrer may pay a sponsorship fee to the content provider based on the number of referred requests for content items, the requesting traffic of the content provider, etc. By contrast, when a requester requests a content item directly from the content provider or from an unrelated referrer, the content provider may provide a limited version of the requested content item (e.g., a brief sample of the content, a summary or synopsis of the content, or metadata describing the content item.) The content provider may also inform the requester of the sponsoring referrers, and may direct the requester to reissue the request for the content item through one of the sponsoring referrers. In this manner, the content provider may recoup its operating expenses and sustain the provision of the services without charging visitors or relying on advertisement revenue.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
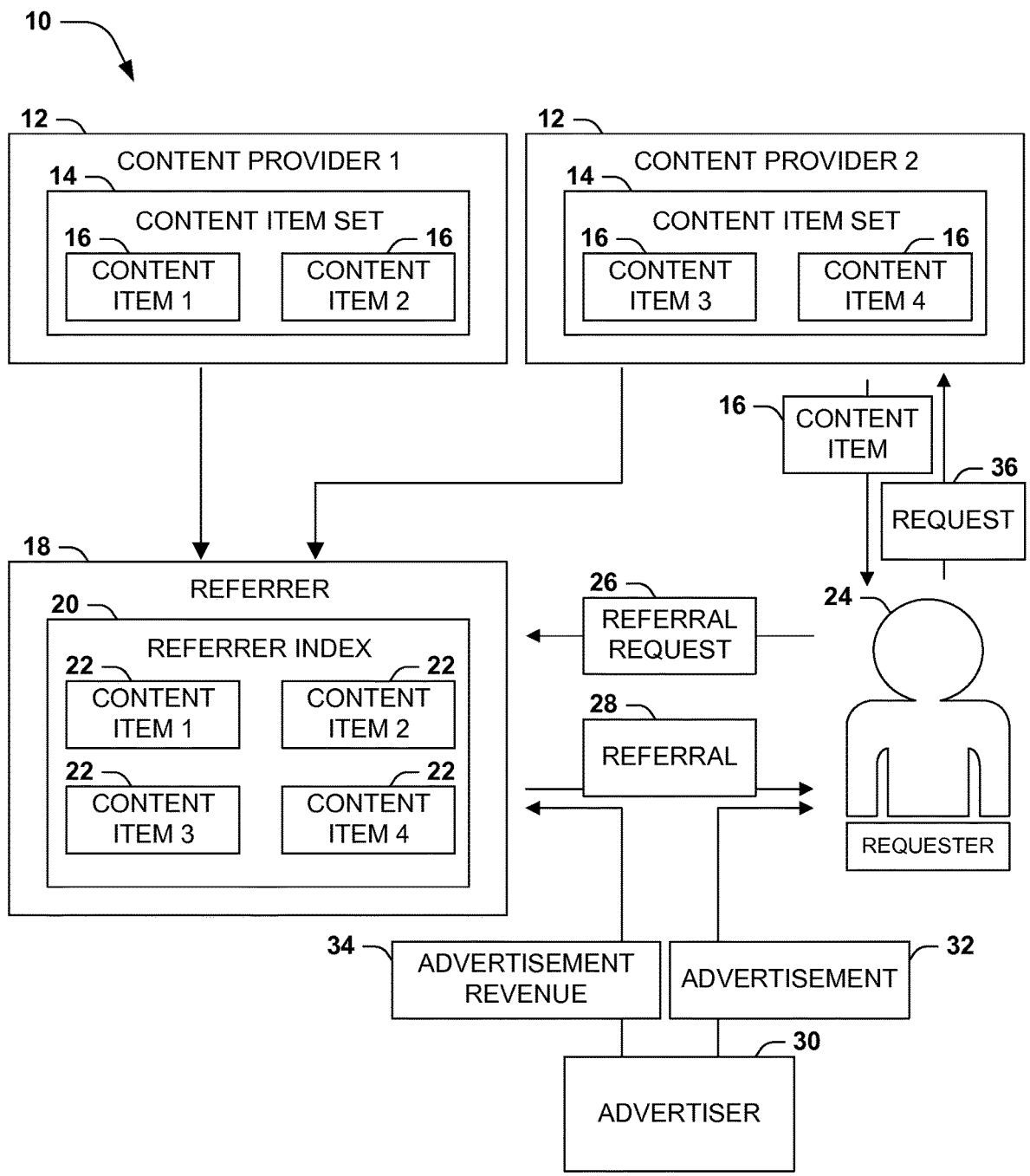
FIG. 1 is an illustration of an exemplary scenario involving a fulfilling of a request for a content item of a content item set upon a referral by a referrer.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Many scenarios in computing, and particularly in the worldwide web, involve a content provider offering a set of content items to requesters. These content items may comprise many types, such as news stories, technical and non-technical articles, compilations of data, media objects such as music and videos, and applications such as games and utilities. These content items may also be generated by the content provider, aggregated from various sources and redistributed by the content provider, generated by users and stored by the content provider, etc. While these content items may be provided to the public, the provision of the content item set involves various types of operating expenses, such as hardware, network access, and salaries of developers of the content item provision services. Additionally, funding may be used to develop new content items and services.

Many techniques may be available to secure a revenue stream from the provision of the content item set to cover the operating and development expenses of the content provider. As a first example, the content provider may charge requesters for the provision of the content items, e.g., as a per-item charge for content items or as a subscription to the content item set. The content provider may offer free but limited versions of content items (e.g., synopses of articles, limited functionality versions of applications, or samples of a media item) in order to entice requesters to pay for full access to the content. For example, a "micropayment" system may be devised to offer content items to requesters in exchange for a steady stream of small payments, e.g., a ten-cent-per-story charge that accrues as a requester requests various content items. As a second example, the content provider may permit one or more advertisers to deliver advertisements to requesters in connection with the provided content items (e.g., by positioning the advertisements within the experience of the requesters, such as embedding the advertisements within the content items.) In addition to securing advertising revenue, the content provider may offer requesters an advertisement-free version of a content item in exchange for a per-item payment or a paid subscription to the content item set. As a third example, the content provider may provide free content items but may offer "value-added" services to requesters; e.g., a content provider of an application may provide a standard version of the application to requesters, but may offer customization or technical assistance as paid services.

However, content providers may experience mixed or poor results with each of these and other techniques for generating revenue in the provision of content items. As a first example, requesters are often unwilling to pay for content items, particularly for items such as news stories that are likely to be freely available elsewhere. As a second example, requesters may be unresponsive to advertisements, and may exhibit low rates of impression, "click-through" interactions, or downstream purchases of advertised goods and services, thereby limiting the availability and consistency of advertising revenue. Moreover, the presentation of particularly active advertisements, such as pop-up or pop-over advertisements, and the embedding of advertisements within content items may irritate requesters, who may endeavor to block or remove such advertisements and/or avoid visiting the content provider in the future. Requesters may also decline to purchase "value-added" services, and may be content with the standard content items that are provided for free. As a result, it may be difficult for a content provider to secure a consistent and sufficient revenue stream to sustain the provision of the content item set to the public. This result may be particularly unfortunate for providers of academic content, such as scientific journals, who may be principally motivated to achieve widespread dissemination of published information, but who may be unable to do so without commercializing at least some aspects of the provision of the content item set.

While content providers have had difficulty securing revenue, some referral services have developed funding models that are successful, consistent, and acceptable to their visitors. In particular, search engines have developed business models that provide plentiful advertising revenue with a minimum of advertising disruption to visitors. These referrers are indexing, and often providing significant or full access to, content items that are developed by content providers, yet no revenue is realized by the content providers who allow their content items to be used by referrers in this manner.

FIG. 1 presents an exemplary scenario 10 illustrating this interaction of content providers 12, a referrer 18 (such as a search engine), and a requester 24. The content providers 12 may each store a content item set 14 comprising various content items 16 that may be of interest to the requester 24. However, the requester 24 may not yet be aware of the content items 16 or the content providers 12 as sources of the content items 16. Instead, the requester 24 may submit a referral request 26 to the referrer 18, such as a search query executed on a search engine. The referrer 18 may comprise a referrer index 20, such as a search engine index, which may contain representations 22 of the content items 16 of respective content providers 12. This referrer index 20 may be generated by periodically reviewing the content item sets 14 of the content providers 12, such as by executing a search engine crawler that identifies all of the content items 16 and creates a description and reference to the content items in the referrer index 20. The referrer 18 may therefore be ready to respond to the referral request 26 of the requester 24 with a recommendation, such as a set of search engine results. The requester 24 may review the referrals 28 provided by the referrer 18 and may issue a request 36 to a content provider 12 for a content item 16, and may receive the content item 16 from the content provider 12. Moreover, the referrer 18 may permit an advertiser 30 to include an advertisement 32 with the referral 28, such as for products that are contextually related to keywords identified in the referral request 26 of the requester 24. In exchange, the advertiser 30 may provide advertisement revenue 34 to the referrer 18.

This exemplary scenario 10 of FIG. 1 may be suitable for the requester 24, which obtains the desired content item 16 free of charge and with minimal exposure to advertisements 32 within the referral 28; to the referrer 18, which may secure a significant and consistent stream of advertisement revenue 34; and to the advertiser 30, which may achieve higher sales of products and services through the targeted placement of the advertisement 32 within the referral 28. However, the content provider 12 receives no revenue from this interaction. While the requester 24 may comprise increased traffic and patronizing of the content item set 14 of the content provider 12, the provision of the content item 16 also bears the costs of costs of providing the content item 16, yet achieves no direct revenue.

In responding to the type of interaction illustrated in the exemplary scenario 10 of FIG. 1, many content providers 12 have settled for the advantage of having their content item sets 14 indexed and referred by the referrer 18, and have sought to achieve revenue streams from the additional traffic provided thereby. Other content providers 12 have opted to limit or restrict the indexing of their content item sets 14 by referrers 18, but at the expense of lost traffic.

However, in addition to opting into the services of such referrers in exchange for more traffic or opting out of the referral services at the expense traffic, other options may be available. In particular, a referrer 18, such as a search engine, may acknowledge that the indexing of the content item set 14 of a content provider 12 adds value to the referral service, e.g., through additional traffic through the referral service and additional advertisement revenue 34 derived therefrom. The referrer 18 may therefore be willing to sponsor the indexing of the content item set 14 by sharing some of the advertisement revenue 34 with the content provider 12. However, the referrer 18 may not be willing to share the advertisement revenue 34 unless the referrer 18 receives an advantage in exchange, e.g., a competitive advantage over other referrers 18 (such as other search engines) that do not share advertisement revenue 34 with the content provider 12. This competitive advantage may be achieved by providing content items 16 in response to requests 36 from requesters 24 who have been referred by the referrer 18, but for requesters 42 referred from other referrers 18 or who directly request content items 16, providing only limited content items (e.g., summaries, samples, excerpts, or metadata descriptors of the content item 16.) Moreover, the content provider 12 may offer such other requesters 24 the corresponding full and free content item 16 if the requester 24 issues the request 36 through the referrer 18. If the requester 24 complies, the referrer 18 may provide the referral 28 to the requester 24, and may derive advertisement revenue 34 from advertisements provided to the requester 24 with the referral 28. The content provider 12 may respond to the referral-based request 36 by providing the content item 16 with no limitations and free of charge to the requester 24. In exchange, the referrer 18 may then share the advertisement revenue 34 with the content provider 12, thereby providing a revenue stream that the content provider 12 may use to cover the operating costs of providing the content item set 14 and to develop or acquire additional content items 16.

Figure 2:
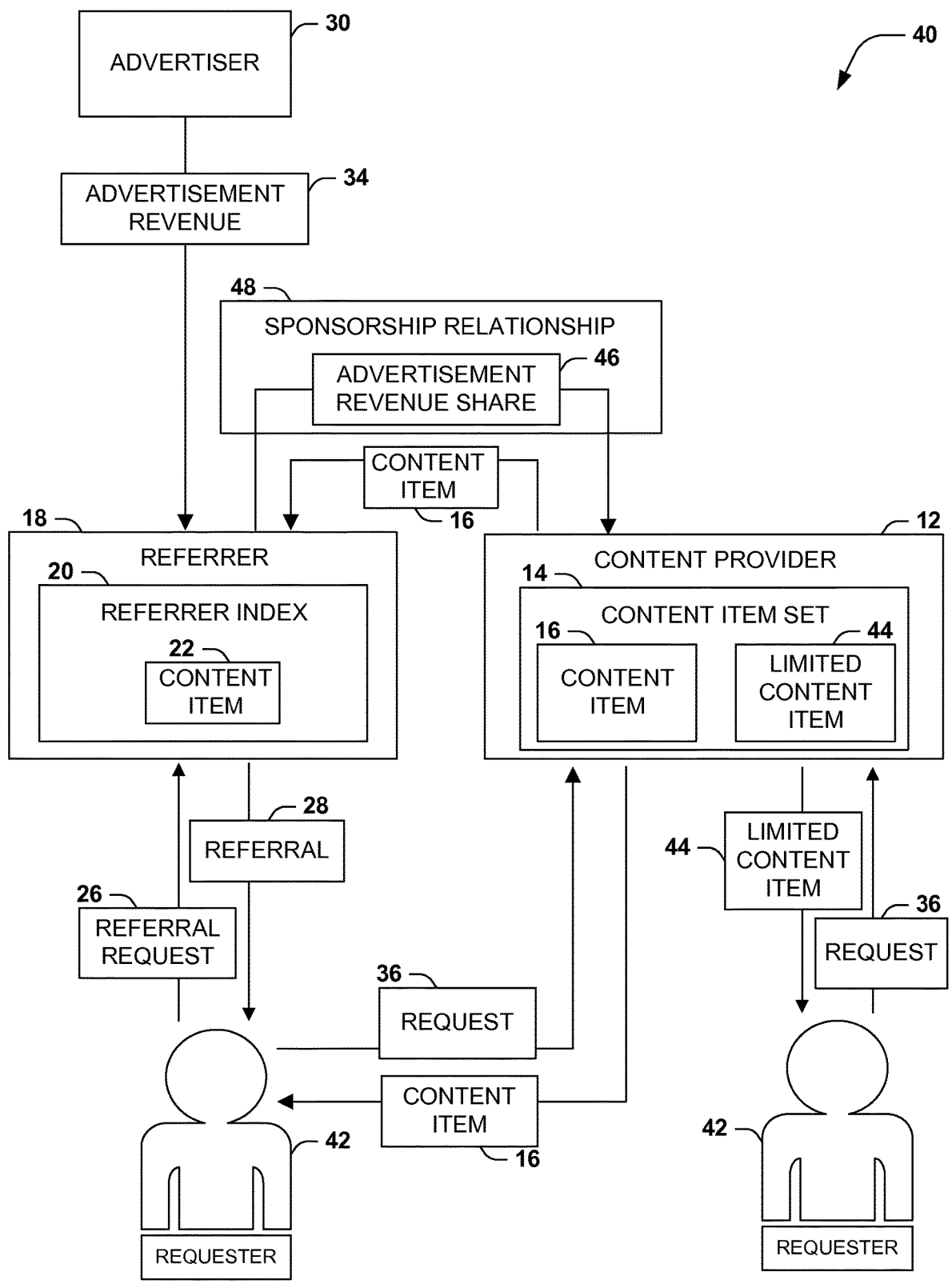
FIG. 2 is an illustration of an exemplary scenario involving another fulfilling of a request for a content item of a content item set upon a referral by a referrer.

FIG. 2 illustrates an exemplary scenario 40 featuring this technique. A content provider 12 may again maintain and provide access to a content item set 14 comprising various content items 16 that may be indexed by a referrer 18, which may store a referrer index 20 comprising representations 22 of the content items 14. The referrer 18 may also cooperate with an advertiser 30 to place advertisements with referrals 28, and may receive advertisement revenue 34 from the advertiser 30 for such placements. A first requester 42 may issue a referral request 26 to the referrer 18, such as a search query to be executed by a search engine, and the referrer 18 may provide a referral 28 in the form of a reference to the content item 16 of the content provider 12. The first requester 42 may then issue the request 36 for the content item 16 to the content provider 12, which may identify that the request 36 follows a referral 28 by the referrer 18, and may provide the full content item 16 to the first requester 42. However, in exchange for providing this content item 16 to the requester 42, the content provider 12 may receive an advertisement revenue share 46 from the referrer 18, according to a sponsorship relationship 48. By contrast, if a second requester 42 directly visits the content provider 12 and issues a request 36 for the content item 16, the content provider 12 may determine that the request 36 of the second requester 42 is not pursuant to a referral 28 by the referrer 18, and may instead provide a limited version 44 of the content item 16, such as a summary or sample of the content item 16. This determination and provision may allow the referrer 18 to serve as an indirect provider of the content items 16 to its visitors, representing a competitive advantage over other referrers that do not have this arrangement with the content provider 12. Moreover, the content provider 12 may refer the second requester 42 to the referrer 18, thereby increasing traffic to the referrer 18 and earning even more advertisement revenue 34. In this manner, the referrer 18 may gain a competitive advantage over other referrers by extending full access to the content item set 14 to its visitors, and the content provider 12 may capture a portion of the value realized by the indexing of the content item set 14 by the referrer 18 as a revenue stream to support the operating expenses and development costs of the content provider 12.

Figure 3:
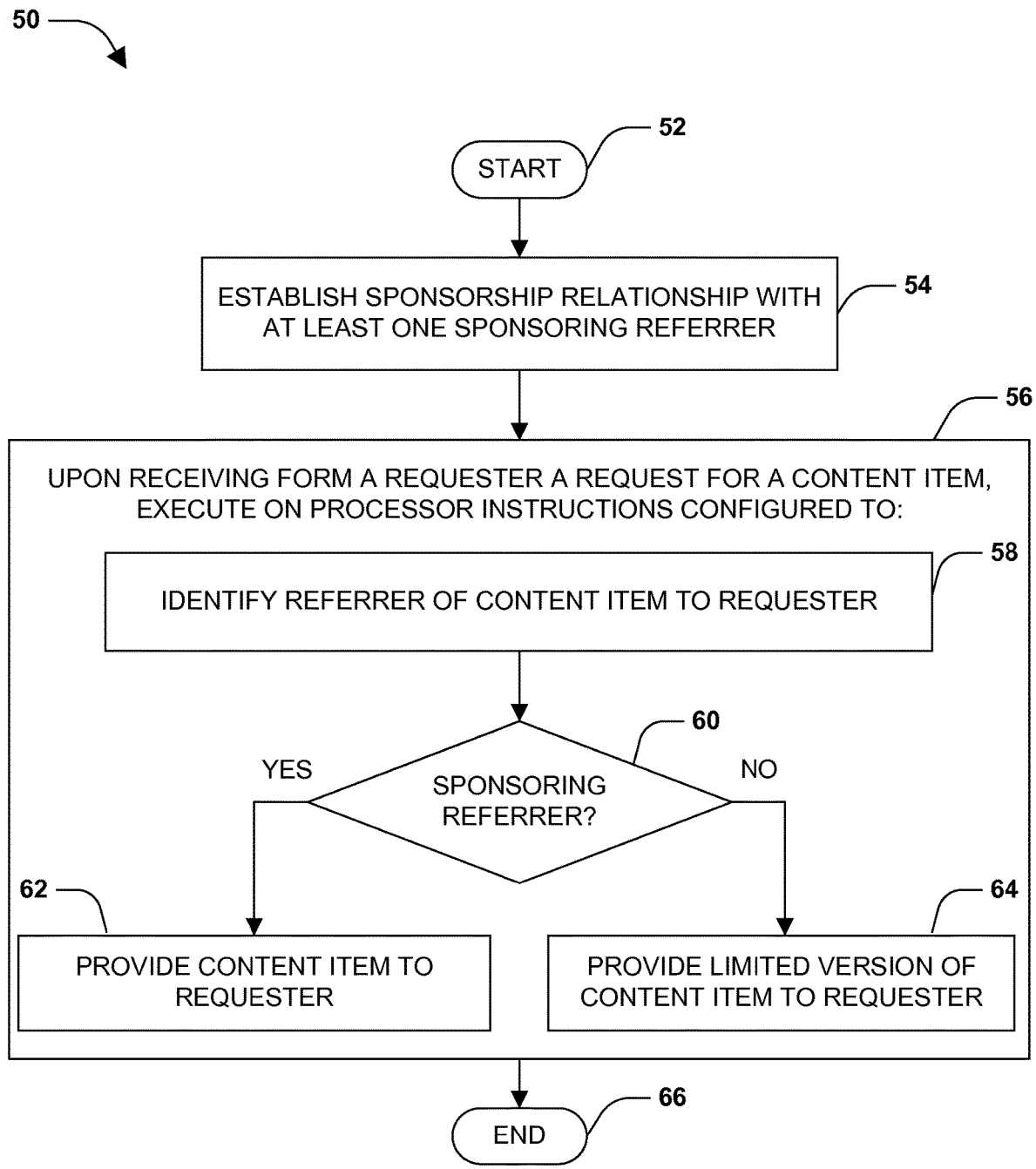
FIG. 3 is a flow chart illustrating an exemplary method of fulfilling requests for content items of a content item set.

FIG. 3 presents a first embodiment of these techniques, illustrated as an exemplary method 50 configured to fulfill requests 36 for content items 16 of a content item set 14. The exemplary method 50 begins at 52 and involves establishing 54 a sponsorship relationship 48 with at least one sponsoring referrer 18. The exemplary method 50 then involves receiving from a requester 24 a request 36 for a content item 16, and upon receiving such a request 36, executing 56 on a processor of a computer a set of instructions configured to perform the techniques discussed herein (e.g., as illustrated in the exemplary scenario 40 of FIG. 2.) The instructions may be configured to identify 58 a referrer 18 of the content item 16 to the requester 24, and the exemplary method 50 diverges at 60 depending on the results of the identifying. If the referrer 18 is identified as a sponsoring referrer, the exemplary method 50 involves providing 62 the content item 16 to the requester 24; but upon failing to identify the referrer as a sponsoring referrer, the exemplary method 50 involves providing 64 a limited version 44 of the content item 16 to the requester 24. Having provided either the full content item 16 or a limited version 44 thereof to the requester 42 in response to the request 36, the exemplary method 50 thereby fulfills the sponsorship relationship 48 with sponsoring referrers 18 according to the techniques discussed herein, and so ends at 66.

Figure 4:
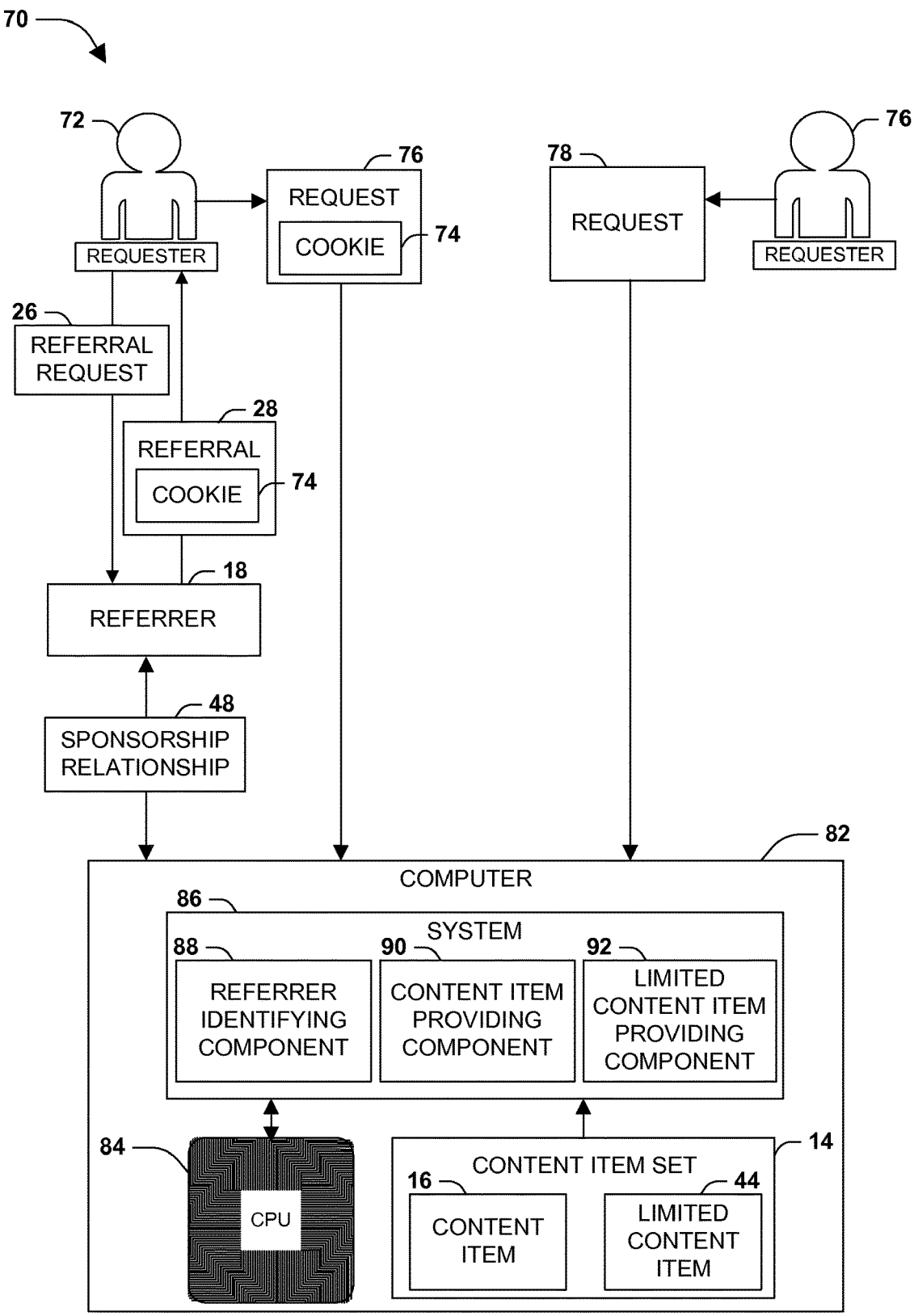
FIG. 4 is a component block diagram illustrating an exemplary system for fulfilling requests for content items of a content item set.

FIG. 4 presents a second embodiment of these techniques, illustrated as an exemplary scenario 70 featuring an exemplary system 86 operating within a computer 82. This computer 82 may be configured to receive and fulfill requests for content items 16 in a content item set 14, whereby, according to the techniques discussed herein, requests that result from referrals by a referrer 18 having a sponsorship relationship 48 with the content provider 12 of the computer 82 may result in a provision of the full content item 16, while requests that do not arise from such referrals 28 may be fulfilled with a limited version 44 of the content item 16. To this end, the computer 82 may comprise an exemplary system 86, which may be embodied, e.g., as a set of software instructions executed by a processor 84 of the computer 82, and which may have access to the content item set 14 comprising various content items 16. The exemplary system 86 may be configured to handle requests 36 for content items 16 received from one or more requesters 24 in the following manner. Upon receiving the request 36, the exemplary system 86 may utilize a referrer identifying component 88, which may be configured to identify a referrer 18 of the content item 16 to the requester 24. Based on this identification, the exemplary system 86 may then fulfill the request by utilizing either a content item providing component 90 or a limited content item providing component 92. If the referrer identifying component 88 identifies the referrer 18 as a sponsoring referrer, the content item providing component 90 may be utilized provide the content item 16 to the requester 24. However, if the referrer identifying component 88 fails to identify the referrer 18 as a sponsoring referrer, the limited content item providing component 92 may be utilized provide a limited version 44 of the content item 16 to the requester 24. In this manner, the exemplary system 86 honors relationships established by the content provider 12 with various sponsoring referrers in exchange for a sponsoring revenue stream.

Figure 5:
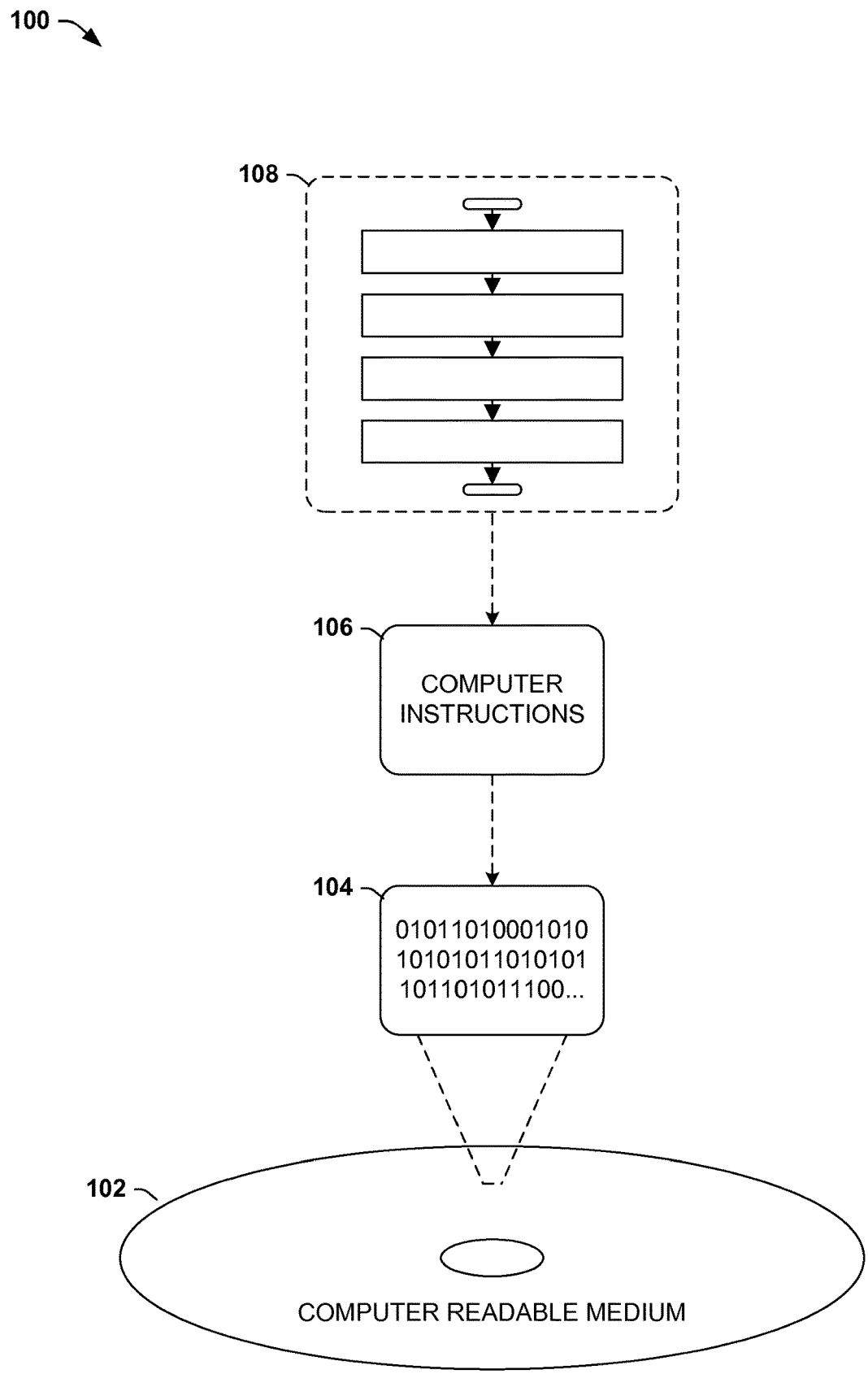
FIG. 5 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 5, wherein the implementation 100 comprises a computer-readable medium 102 (e.g., a CD-R, DVD-R, or a platter of a hard disk drive), on which is encoded computer-readable data 104. This computer-readable data 104 in turn comprises a set of computer instructions 106 configured to operate according to the principles set forth herein. In one such embodiment, the processor-executable instructions 106 may be configured to perform a method of fulfilling requests for content items of a content item set, such as the exemplary method 50 of FIG. 3. In another such embodiment, the processor-executable instructions 106 may be configured to implement a system for fulfilling requests for content items of a content item set, such as the exemplary system 86 of FIG. 4. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 50 of FIG. 3 and the exemplary system 86 of FIG. 4) to confer individual and/or synergistic advantages upon such embodiments.

A first aspect that may vary among embodiments of these techniques relates to the scenarios wherein these techniques may be utilized. As a first example, a sponsoring referrer may comprise a search engine, which may be configured to index at least a portion of the content item set 14 of the content provider 12, and to satisfy search queries issued by visitors with search engine results that include a referral 26 to the content items 16 of the content item set 14. The requester 24 may comprise a search engine visitor, who may be referred to the content item 16 through the search engine result provided in response to the search query. As a second example, the sponsoring referrer may comprise a content review site or aggregator, which may present reviews of various content items 16 to the requester 24 that prompt the requester 24 to request the content item 16 from the content provider 12. In one such scenario, the content review site may permit an embedding of the requested content item 16 within the content of the content review site, such as by rendering the content item 16 within a media player hosted on the content review site (if so requested by the requester 24 and permitted by the content provider 12.) As a third example, the sponsoring referrer may comprise a social networking site, which may enable a friend or associate of the requester 24 to recommend or reference the content item 16 to the requester 24, thereby prompting the requester 24 to request the content item 16 from the content provider 12. Those of ordinary skill in the art may identify many scenarios wherein the techniques discussed herein may be utilized.

A second aspect that may vary among embodiments of these techniques relates to the nature and manner of establishing of sponsoring relationships 48 with various referrers 18. As a first example, the content provider 12 may choose to establish an exclusive relationship with one sponsoring referrer as the only referrer 18 through whom requesters 24 may obtain free access to the content items 16 of the content provider 12. In some scenarios, an exclusive relationship may be advantageous; e.g., the exclusive sponsoring referrer 18 may achieve a large competitive advantage over competing referrers, and the content provider 12 may in exchange receive a comparatively large revenue stream from the referrer 18. However, in other scenarios, exclusivity may be undesirable for several reasons. As a first example, if a first referrer 18 develops exclusive sponsorship relationships 48 with a first set of content providers 12, a second referrer 18 may be promoted to develop exclusive sponsorship relationships 48 with a second set of content providers 12, and a third referrer 18 may be develop exclusive sponsorship relationships 48 with still other content providers 12. As a result, each referrer 18 may fully index and refer to only a small portion of content providers 12, and it may be difficult for a requester 24 to identify which referrer 18 may provide a referral 28 that entitles the requester 24 to access the full content item 16 for free. As a second example, a content provider 12 may receive a larger and more consistent revenue stream by developing sponsorship relationship with many referrers 18 instead of an exclusive relationship with a single referrer 18. As a third example, some content providers may favor a wide provision of the content item set 14 to requesters 24 over a narrower provision that entails a larger revenue stream. For example, academic institutions and scientific journals may be ethically or socially compelled to choose relationships with referrers 18 that promote easy access to all requesters 24 in the interests of academic and scientific freedom, and may establish sponsorship relationships 48 only to receive a sufficient revenue stream to sustain and develop the content item set 14. Therefore, even if a larger revenue stream might be obtained as a result, such exclusive relationships may be disadvantageous to such content providers 12. For these and other reasons, a content provider 12 may prefer to establish nonexclusive sponsorship relationship 48 with two or more referrers 18.

A second variation of this second aspect relates to the manner of establishing the sponsorship relationships 48 with referrers 18. As a first example, the content provider 12 may negotiate a sponsorship fee with the a referrer 18, based on referrals 28 of requests 26 for content items 16 that may be received by the referrer 18 from requesters 24. However, it may be difficult to host and complete such negotiations with a large set of referrers 18 who may wish to establish sponsorship relationships 48 (and, conversely, it may be even more difficult for a referrer 18 to establish sponsorship relationships 48 with the very large set of content providers 12 that may be available, e.g., on the worldwide web.) Alternatively, the content provider 12 may provide automated mechanisms whereby a referrer 18 may accept a sponsorship relationship 48.

As a second example of this second variation, some referrers 18, such as search engines, may encounter the content provider 12 during an exploration of the content item set 14, such as by a web crawler that automatically discovers and indexes items in the referrer index 20. In some of these scenarios, the content provider 12 may provide a search metadata object to the web crawler that indicates how the content provider 12 may wish the referrer 18 to index the content item set 14 or to represent content items 16 to requesters 24. One common technique for this specification is a "robots.txt" document, which indicates to a web crawler the portions of the website that the content provider 12 may prefer to have excluded from indexing by the referrer 18. In view of these techniques, a similar mechanism may be used to establish a sponsorship relationship 48. For example, the content provider 12 may provide a search metadata object that notifies the referrer 18 of the terms of a sponsorship relationship 48 (e.g., the sponsorship fee that the content provider 12 may be entitled to charge to the referrer 18 in exchange for providing full and free content items 16 to requesters 24 who are referred to the content provider 12 by the referrer 18.) This search metadata object may operate in a similar manner to a "shrink-wrap agreement" or a "click-wrap agreement," wherein a subsequent accessing of the services by the recipient indicates an acceptance of the offered relationship. For example, the referrer 18 may choose to index the content item set 14, accept the sponsorship relationship 48, and agree to pay the sponsorship fees associated therewith, or may choose not to index the content item set 14.

As a third example of this second variation, the content provider 12 may choose to develop and expose to referrers 18 a programmatic interface that facilitates the establishing of sponsorship relationship 48. For example, a web service may be developed and published that permits referrers 18 to request to establish a sponsorship relationship 48, and the content provider 12 may respond to such requests by establishing such sponsorship relationships 48 (e.g., by configuring an embodiment of these techniques to identify the referrer 18 as a sponsoring referrer, and to provide full and free content items 16 in response to referrals 28 of requesters 24 from the referrer 18.) However, those of ordinary skill in the art may devise many ways of establishing sponsorship relationships 48 with referrers 28 according to the techniques discussed herein.

A third aspect that may vary among embodiments of these techniques relates to the identification of a referrer 18 of a requester 24 as a sponsoring referrer, or a failure to identify the referrer 18 as a sponsoring referrer (which may involve either an identification of the referrer 18 as a non-sponsoring referrer, such as a search engine that does not have a sponsorship relationship 48 with the content provider 12; a failure to identify the referrer 18, which may be intentionally or accidentally misidentifying itself or withholding its identity; or an absence of a referrer 18, in case the requester 24 is directly visiting the content provider 12 and has not received a referral 28 from any referrer 18.) It may be possible to identify the referrer 18 in many ways. As a first example, the referrer 28 may expressly identify itself by embedding a referrer identifier in the referral 28, e.g., by providing a hyperlink to the requester 24 that identifies a content item 16 but that also identifies the referrer 18 through an embedded URL parameter or an HTTP referrer header. A requester 24 utilizing such a referral 28 may tacitly indicate to the content provider 12 the identity of the referrer 18, and an embodiment of these techniques may therefore identify the referrer 18 by detecting the referrer identifier in the request 36 from the requester 24. As a second example, the content provider 12 may embed an identifier of the referrer 18 in content items 16 provided to the referrer during an indexing of the content items 16. For example, if the content provider 12 detects an exploration or indexing of the content item set 14 by the referrer 18, the content provider 12 may provide referrer identifying references to such content items 16, e.g., customized URLs that embed a referrer identifier. When the referrer 18 later provides a referral 28 to a requester 24, the referral 28 may identify the referrer 18 as part of the request 32 subsequently issued by the requester 24.

A first example of this third aspect is illustrated in the exemplary scenario 70 of FIG. 4. In this exemplary scenario 70, a first requester 72 consults a referrer 18 with a referral request 26 for content items 16 such as may be stored in the content item set 14 of the computer 82. The referrer 18 may comprise an index that references the content item set 14 of the computer 82, and may enable the referrer 18 to referral request 26 in a convenient manner. Moreover, the referrer 18 may have a sponsorship relationship 48 with the content provider 12 that manages the computer 82, such that referrals 28 generated by the referrer 18 may be fulfilled with the full content item 16 referenced thereby. Accordingly, in response to the referral request 26 of the first requester 72, the referrer 18 may provide a referral 28 referencing the computer 82 and the content items 16 stored therein. However, in this exemplary scenario 70, the referral 28 also provides to the first requester 72 a cookie 74 that may identify the referrer 18 as having provided the referral 28 to the content item 16 of the computer 82. This cookie 74 may be associated with a first request 76 issued by the first requester 72 to the computer 82. The referrer identifying component 88 of the exemplary system 86 may evaluate the first request 76 and identify the cookie 74 associated therewith, thereby verifying that the first request 74 was referred by the referrer 18, and may authorize the content item providing component 90 to send the content item 16 to the first requester 72. By contrast, a second requester 76 may issue a second request 78 that is not associated with any referrer 18 having a sponsorship relationship 48 with the content provider 12, and that does not have a cookie 74 associated with the second request 78. The referrer identifying component 88 may identify the absence of such a cookie 74, and may invoke the limited content item providing component 92 to fulfill the second request 78 by providing the limited version 44 of the content item 16. In this manner, the referrer identifying component 88 may utilize one technique for identifying the referrer 18 of a request 76.

Figure 6:
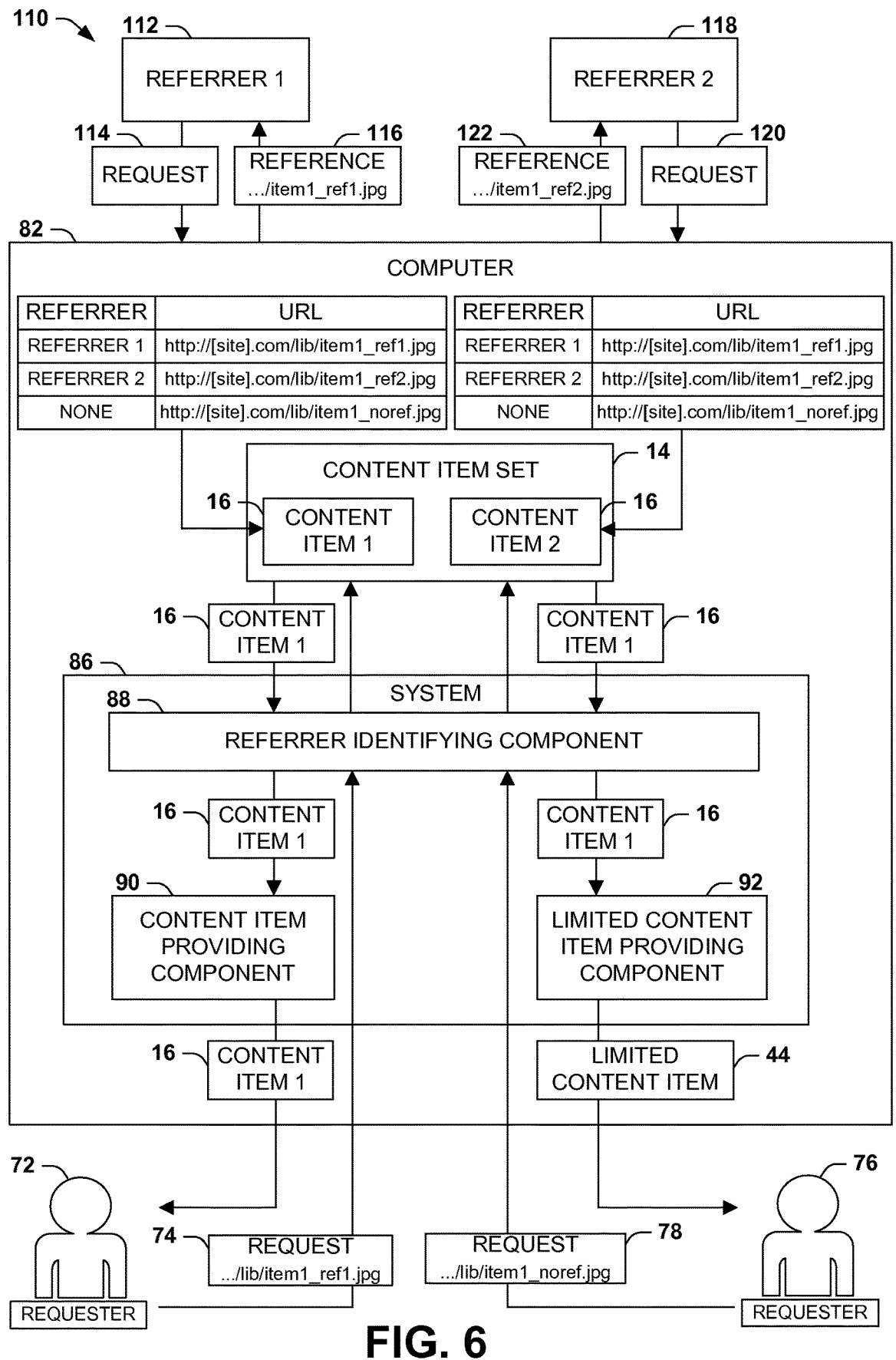
FIG. 6 is an illustration of a scenario featuring an exemplary system configured to identify referrers of requests for content items.

A second example of this third aspect is illustrated in FIG. 6 as an exemplary scenario 110 featuring an encoding of the identities of a referrer in references to the content items 16 of the content item set 14. In this exemplary scenario 110, a computer 82 comprising a content item set 14 may be managed by a content provider 12 having sponsorship relationships 48 with a first referrer 112 and a second referrer 118, whereby users of these referrers may be provided with full versions of content items 16 requested therethrough. The computer 82 may therefore achieve an identification of the referrers of such requests in the following manner. The first referrer 112 may index the content items 16 of the content item set 14 through one or more requests 114, e.g., generated by a web crawler. The computer 82 may identify the web crawler of the first referrer 112, and may respond to such requests 114 with distinctive references 116 that identify both the first referrer 112 as well as the content items 16. For example, the computer 82 may generate distinctive URLs that point to a first content item, but that also indicate the first referrer 112 as the source of the reference 116 (e.g., by including "_ref1" in the URL.) Similarly, a second referrer 118 with whom the content provider 12 has a sponsorship relationship 48 may also index the content item set 14, and the computer 82 may provide a different set of distinctive references 122 to such content items 16 (e.g., those that include "_ref2" in the URL.) Moreover, the computer 82 may publicize a set of references to such content items 16 that do not contain a reference to any such referrer (e.g., by publicizing on its website a list of URLs to such content items 16 that include "_noref" in the URL.) The computer 82 is thereby configured to recognize and fulfill several references to a particular content item 16, but may fulfill such requests in different ways, based on the identification of a particular referrer 112 encoded in the request. Of course, it may be desirable to encode this referrer information in a less transparent manner, but this exemplary scenario 110 is formulated in a simplified manner to illustrate the concepts presented herein.

If references to such content items 16 may be devised in this manner, an exemplary system 86 may be implemented according to these techniques that identifies referrers by the URL of the referenced content items 16. For example, a first requester 72 may issue a first request 74 for a content item 16 through the first referrer 112, and the first request 74 may therefore reference the content item 16 with a URL that identifies the first referrer 112. The exemplary system 86 may be configured to receive the first request 74 and to provide it to the referrer identifying component 88, which may first identify the requested content item 16 and may retrieve it from the content item set 14. The referrer identifying component 88 may next examine the URL of the first request 74 and may identify the first referrer 112 as the source of the first request 74. Accordingly, the referrer identifying component 88 may invoke the content item providing component 90 to send the full version of the first content item 16 to the first requester 72. By contrast, a second requester 76 may issue a second request 78 using a URL that does not reference a referrer with which the content provider 12 as a sponsorship relationship 48. Again, the second request 78 may be received by the referrer identifying component 88, which may retrieve from the content item set 14 the requested content item 16. However, when the referrer identifying component 88 examines the request 78, it may identify the absence of such a referral, and may therefore invoke the limited content item providing component 92 to generate a limited version 44 of the requested content item 16, and to deliver the limited content item 44 to the second requester 76. In this manner, the exemplary system 86 may utilize this URL encoding technique to identify the referrers of various content items 16. However, those of ordinary skill in the art may devise many ways of identifying referrer 18 as part of a request 32 issued by a requester 24 while implementing the techniques discussed herein.

A fourth aspect that may vary among embodiments of these techniques relates to the provision of full and free content items 16 in response to requests 32 received from requesters 24. When an embodiment of these techniques receives a request 32 for a particular content item 16, the embodiment may provide the full content item 16 if the request 32 identifies the referrer 18 as a sponsoring referrer. However, the embodiment may also provide the full content item 16 in other circumstances. As a first example, in addition to establishing a revenue stream through sponsorship relationships 48 with sponsoring referrers 18, the content provider 12 may also receive revenue by allowing requesters 24 to subscribe to the content item set 14, such as by paying a per-item, periodic, or one-time subscription fee. The content provider 12 (or an embodiment of these techniques provided therein) may therefore endeavor to identify the requester 24 as a subscriber of the content item set 14, and may provide the content item 16 to the requester 24 if so identified. As a second example, the embodiment may attempt to determine whether a requester 24 is actually a sponsoring referrer 18, e.g., a web crawler configured to explore and index the content item set 14. If the requester 24 is identified as a sponsoring referrer 18, the embodiment may provide the requested content item 16 to the requester 24 in order to facilitate the indexing of the content item set 14. As a third example, it may even be advantageous to provide the content item 14 to non-sponsoring referrers 18, e.g., to search engines that are exploring and indexing the content item set 14 but that do not have a sponsoring relationship 48 with the content provider 12. This may be advantageous by allowing requesters 24 to discover the content items 16 through references by the referrers 18, but by persuading the requesters 24 to then obtain a referral from a sponsoring referrer 18 in order to receive the full and free content item 16. This example may divert requesters 24 through the sponsoring referrers 18 and thereby promote the sponsorship relationship 48 and the revenue stream generated thereby, and/or may prompt the non-sponsoring referrer 18 to accept a sponsoring relationship 48 with the content provider 12 in order to avoid losing traffic. Those of ordinary skill in the art may identify other circumstances wherein a full and free content item 16 may be provided to a requester 24 in accordance with the techniques discussed herein.

A fifth aspect that may vary among embodiments of these techniques relates to the provision of limited versions 44 of content items 16 in response to requests 24 that are not associated with a referral 28 from a sponsoring referrer 18. As a first example, the limited version 44 may comprise a selection of various portions of a content item, such as may be selected form a set of content item portions. For example, the limited version 44 may comprise a summary of the content item 16; a sample of the content item 16 (e.g., an excerpt of a textual content item, a small video segment in a video content item, or a downsampled audio version of an audio content item); a bibliographic reference to the content item 16 (e.g., a citation to a printed journal where a full version of the content item 16 may be found); and a metadata descriptor of the content item 16 (e.g., the names and contact information of the authors of the content item 16, keywords associated with the content item 16, or the length or date of publication of the content item 16.) As a second example, the limited version 44 of the content item 16 may include various sponsorship items, which may be selected by the content provider 12 and included in the limited version 44 in order to secure sponsorship revenue through another mechanism. For example, the limited version 44 may contain a referral to a sponsoring referrer 18, whereby the requester 24 may obtain a referral 28 that entitles the requester 24 to a full and free version of the content item 16; an advertisement for a subscription to the content item set 14, whereby the requester 24 may pay a subscription fee to obtain access to the content items 16 of the content item set 14; and/or an advertisement provided by an advertiser 30 in exchange for advertisement revenue 34 provided to the content provider 12. These sponsorship items may therefore provide an alternative revenue stream for the content provider 12 in exchange for providing the limited version 44 of the content item 16 to the requester 24 in the absence of a referral 28 from a sponsoring referrer 18. As a third example, an embodiment of these techniques may store a limited version 44 (e.g., a downsampled version of the media comprising the content item 16) in the content item set 14, such as illustrated in the exemplary scenario 70 of FIG. 4. Alternatively, an embodiment of these techniques may generate the limited version 44 from the full content item 16 on an ad hoc basis, e.g., when requested by the requester 24, such as illustrated in the exemplary scenario 110 of FIG. 6. Those of ordinary skill in the art may devise many techniques for generating and providing the limited versions 44 of the content items 16 while implementing the techniques discussed herein.

A sixth aspect that may vary among embodiments of these techniques relates to the computation and charging of the sponsoring revenue stream arising from the sponsorship relationship 48 with a sponsoring referrer 18. As a first example, an embodiment of these techniques may, upon providing a full and free content item 16 to a requester 24 after a referral 28 by the sponsoring referrer 18, record the fulfilling of the request 32, and may charge the sponsoring referrer 18 a sponsorship fee based on the content item(s) 16 provided to the requester 24. For example, the sponsorship fee may be computed as a per-item fee, and the embodiment may affirmatively and periodically charge the sponsoring referrer 18 based on the recorded fulfillments of the referrals 28 by the sponsoring referrer 18. As a second example, an embodiment of these techniques might not track the fulfillment of such requests 32, and may allow the sponsoring referrer 18 (or a third party) to track the sponsorship fees, e.g., based on the number of referrals 28 provided by the sponsoring referrer 18 to the content items 16 of the content item set 14. As a third example, the sponsorship fee may be computed according to various sponsorship factors, such as a requested content items metric (e.g., a metric based on the aggregate provision of content items 16 in response to referrals 28, such as a bandwidth measurement); a requester traffic metric (e.g., the number of requesters 24 referred to the content provider 12 by the sponsoring referrer 18); and a referrer revenue metric, which may be associated with the revenue received from the sponsoring referrer 18 in exchange for referring the requester 24 to the content item 16 (e.g., an advertisement revenue share 46, computed as a portion of the additional advertisement revenue 34 received from the referrer 18 by the advertiser 30 as a result of indexing the content items 16 of the content item set 14.) As a fourth example, the content provider 12 may establish a total sponsorship target, such as a total amount of sponsorship revenue that may be sufficient to cover the operating expenses and development costs of the content item set 14, and may compute the sponsorship fee as an allocation of the total sponsorship target over the set of requests 32 for the content items 16 of the content set 14. This example may be useful, e.g., for maintaining a sufficient but comparatively low sponsorship fee, which may enable small and upstart referrers 18 that do not yet have significant advertising revenue. As a fifth example, the sponsorship relationship 48 may entail a flat sponsorship fee to be paid to the content provider, such as an annual or monthly fee that is not proportional to the number of referrals 28 provided or requests 32 fulfilled. This example may be advantageous due to the predictability of the sponsorship fee that may be charged to the sponsoring referrer 18.

Figure 7:
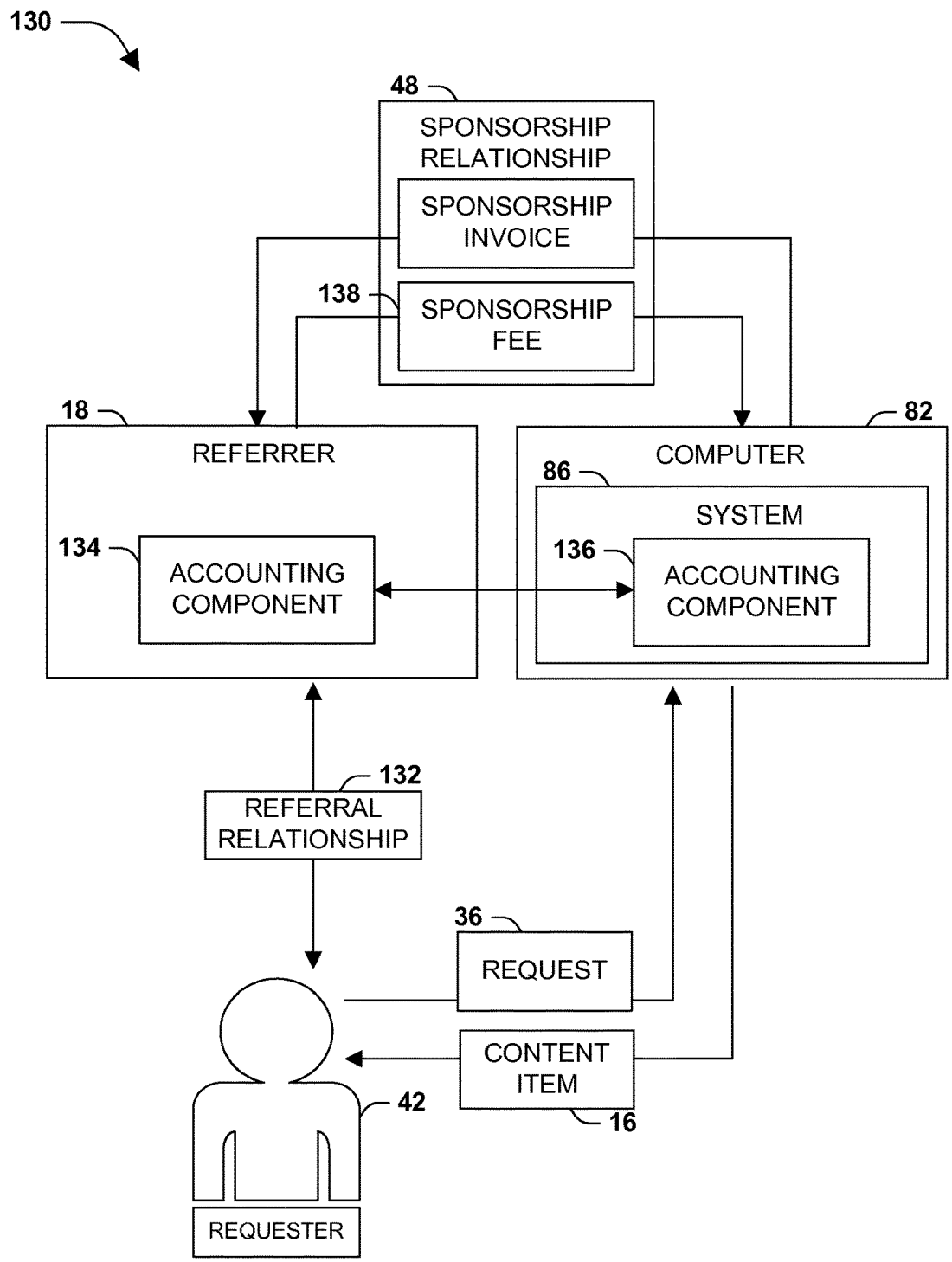
FIG. 7 is an illustration of a scenario featuring an exemplary system configured to track and bill referral fees to a referrer.

FIG. 7 illustrates an exemplary scenario 130 featuring an exemplary system 86 configured to track sponsorship fees and to negotiate payment of sponsorship fees by a referrer 18 according to a sponsorship relationship 48. In this exemplary scenario 130, a requester 42 may be configured to extend a set of services to requesters 42 who significantly utilize the referrer 18, e.g., by requesting a particular number of referral requests per month, thereby patronizing the referrer 18 enough to qualify for "membership" benefits, such as the provision of referrals 28 identifying the full versions of content items 16 in content item sets 14 of content providers 12 with whom the referrer 18 has a referral relationship 48. Accordingly, when a requester 42 issues a referral request to the referrer 18, the referrer 18 may endeavor to identify the requester 42 (e.g., through a cookie placed on the computer of the requester 42, or through an authentication mechanism, such as a username and password login component), and may determine whether the referrals 28 provided to this requester 42 are to include references to full versions of the content items 16 (for "members" of the referrer 28) or references to limited versions of the content items 16 (for "non-members" of the referrer 28.) This arrangement may therefore benefit the referrer 18 by garnering higher referral traffic from requesters 42 that results in proportionally higher advertisement revenue 34 received from advertisers 30, while also granting the requesters 42 who utilize the referrer 18 free access to the full versions of referred content items 16.

As further illustrated in the exemplary scenario 130 of FIG. 7, a requester 42 may have may developed a referral relationship 132 with a referrer 18, thereby entitling the requester 42 to referrals comprising references to the full versions of content items 16 of the content item set 14 of a computer 82. The requester 42 may therefore issue a request 36 to the computer 82 referencing a content item 16 and identifying the referrer 18. In this exemplary system 86 embodying these techniques, an accounting component 136 of the computer 82 may communicate with a complementary accounting component 134 of the referrer 18. For example, the accounting component 136 may verify that the request 36 was received in response to a referral by the requester 18 (e.g., by verifying a cookie 74 associated with the request 36.) The referrer 18 may examine the request 36 and may either verify the request 36, if in response to a referral by the referrer 18, or may reject the request 36, if not in response o a referral by the referrer 18. If the referrer 18 verifies the request 36, the accounting component 136 may record the verification and may authorize the exemplary system 86 (e.g., a content item providing component 90) to send the full version of the content item 16 to the requester 42. Moreover, the accounting component 136 may track this provision, and may later deliver to the referrer 18 a sponsorship invoice that bills the referrer 18 (e.g., for all such provisions that have been authorized by the referrer 18 for a particular period, such as within a particular month.) The accounting component 134 of the referrer 18 may receive the sponsorship invoice, verify the charges, and respond by sending a sponsorship fee 138 to the content provider 12, which may be credited by the accounting component 136. This verification of requests 36 by the referrer 18 may reduce misuse of the content item set 14, such as by competing referrers that attempt to copy the types of references provided by the referrer 18 that are associated with full versions of the content items 16, or that are copied by requesters that do not have referral relationships 132 with the referrer 18. This verification of requests 36 may also be useful for preauthorizing the provision of full versions of content items 16 to requesters 42 that later result in a charging of sponsorship fees to the referrer 18, thereby promoting the trust of the sponsorship relationship 48 and/or reducing subsequent disputes over sponsorship fees 138. However, this exemplary scenario 130 illustrates only one technique for tracking and invoicing referrers 18 for the provision of full versions of content items 16 pursuant to sponsorship relationships 48. Those of ordinary skill in the art may choose many ways of tracking and computing sponsorship fees in accordance with the techniques discussed herein.

A seventh aspect that may vary among embodiments of these techniques relates to additional sponsorship efforts that may promote the sponsorship relationship 48 between the sponsoring referrer 18 and the content provider 12. As a first example, when a content item 16 is provided to a requester 24 in response to a referral 28 from the referrer 18, the content provider 12 and/or the content item 16 may inform the requester 24 of the sponsorship relationship 48 (e.g., "this free content item was sponsored by . . . ") As a second example, the content provider 12 may allow searchers to search the content item set 14, such as by accepting search queries to be applied to the content item set 14, but may refer such searches to a sponsoring referrer 18. For example, upon receiving the search query from a searcher, the content provider 12 may either redirect the searcher to a search results page for the search query at the sponsoring referrer 18, or may embed search results generated by the sponsoring referrer 18 for the search query in the website of the content provider 12 while identifying the sponsoring referrer 18 as the source of the search results (e.g., "search results provided by . . . ") As a third example, a content item set search component may be developed and provided to requesters 24. For example, a customized toolbar, search widget, or search application may be deployed to requesters 24, and may therefore facilitate the requesters 24 in executing searches upon the content item set 14. This component may promote the sponsorship relationship with a sponsoring referrer 18 in various ways. As a first example, the content item set search component may identify the content item set 14 and the sponsoring referrer 18, such as with a visual label indicating the sponsorship relationship 48 to such requesters 24 as part of the user interface of the search component (e.g., a "[Content Item Set Name]+[Sponsoring Referrer Name]" label.) As a second example, the search component may be configured to refer search queries executed by the requester 24 to the sponsoring referrer 18, i.e., by redirecting the requester 24 to a search results page generated by the sponsoring referrer 18. This may be helpful, e.g., for further identifying the sponsorship relationship 48 to requesters 24, and for driving additional traffic to the sponsoring referrer 18, which may earn greater advertisement revenue 34 for the sponsoring referrer 18. Those of ordinary skill in the art may devise many ways of promoting sponsorship relationships 48 with various sponsoring referrers 18 while implementing the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
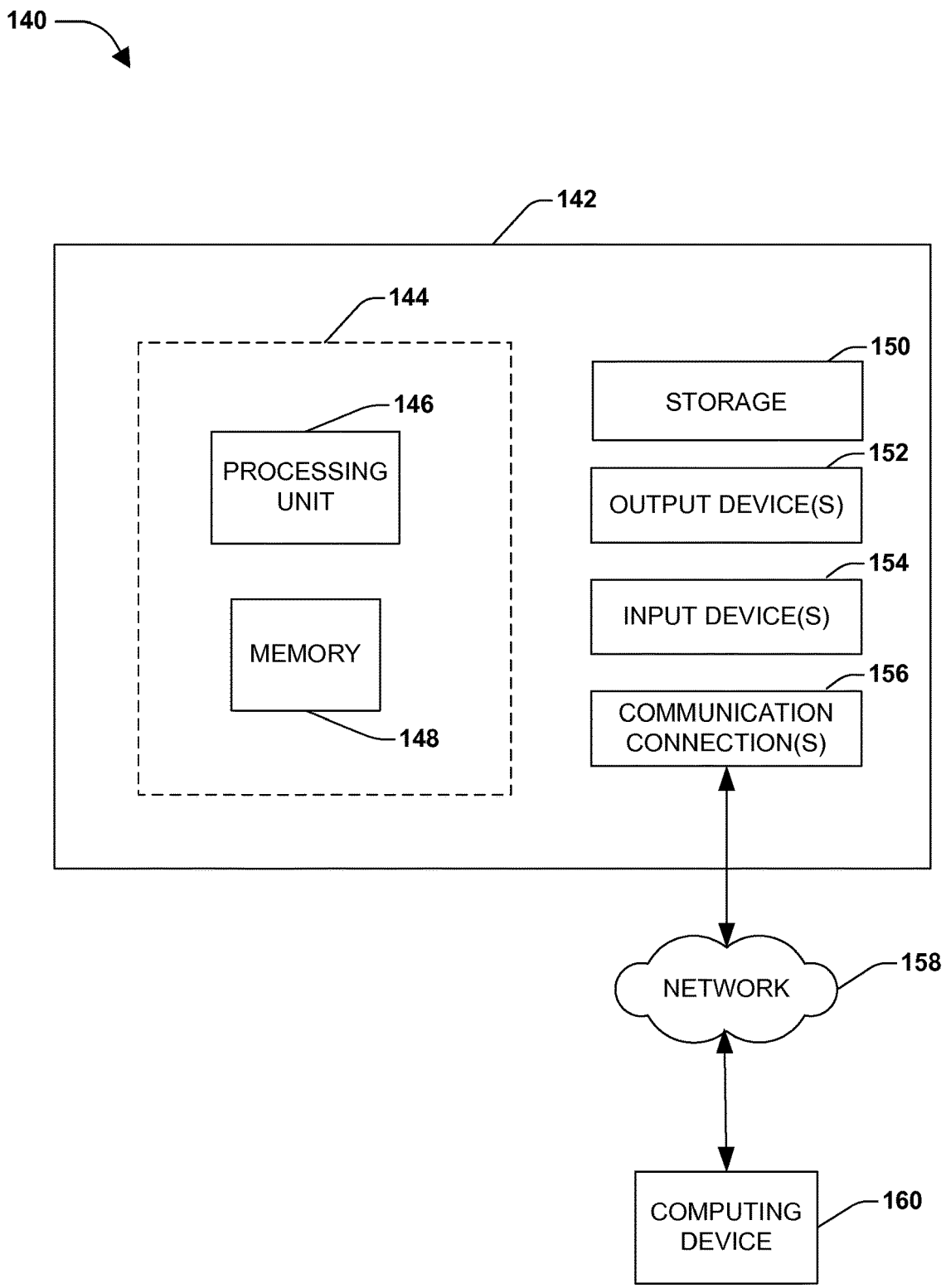
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 140 comprising a computing device 142 configured to implement one or more embodiments provided herein. In one configuration, computing device 142 includes at least one processing unit 146 and memory 148. Depending on the exact configuration and type of computing device, memory 148 may be volatile (such as RAM, for example), non-volatile (such as ROM, flash memory, etc., for example) or some combination of the two. This configuration is illustrated in FIG. 8 by dashed line 144.

In other embodiments, device 142 may include additional features and/or functionality. For example, device 142 may also include additional storage (e.g., removable and/or non-removable) including, but not limited to, magnetic storage, optical storage, and the like. Such additional storage is illustrated in FIG. 8 by storage 150. In one embodiment, computer readable instructions to implement one or more embodiments provided herein may be in storage 150. Storage 150 may also store other computer readable instructions to implement an operating system, an application program, and the like. Computer readable instructions may be loaded in memory 148 for execution by processing unit 146, for example.

The term "computer readable media" as used herein includes computer storage media. Computer storage media includes volatile and nonvolatile, removable and non-removable media implemented in any method or technology for storage of information such as computer readable instructions or other data. Memory 148 and storage 150 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 142. Any such computer storage media may be part of device 142.

Device 142 may also include communication connection(s) 156 that allows device 142 to communicate with other devices. Communication connection(s) 156 may include, but is not limited to, a modem, a Network Interface Card (NIC), an integrated network interface, a radio frequency transmitter/receiver, an infrared port, a USB connection, or other interfaces for connecting computing device 142 to other computing devices. Communication connection(s) 156 may include a wired connection or a wireless connection. Communication connection(s) 156 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 142 may include input device(s) 154 such as keyboard, mouse, pen, voice input device, touch input device, infrared cameras, video input devices, and/or any other input device. Output device(s) 152 such as one or more displays, speakers, printers, and/or any other output device may also be included in device 142. Input device(s) 154 and output device(s) 152 may be connected to device 142 via a wired connection, wireless connection, or any combination thereof. In one embodiment, an input device or an output device from another computing device may be used as input device(s) 154 or output device(s) 152 for computing device 142.

Components of computing device 142 may be connected by various interconnects, such as a bus. Such interconnects may include a Peripheral Component Interconnect (PCI), such as PCI Express, a Universal Serial Bus (USB), firewire (IEEE 13104), an optical bus structure, and the like. In another embodiment, components of computing device 142 may be interconnected by a network. For example, memory 148 may be comprised of multiple physical memory units located in different physical locations interconnected by a network.

Those skilled in the art will realize that storage devices utilized to store computer readable instructions may be distributed across a network. For example, a computing device 160 accessible via network 158 may store computer readable instructions to implement one or more embodiments provided herein. Computing device 142 may access computing device 160 and download a part or all of the computer readable instructions for execution. Alternatively, computing device 142 may download pieces of the computer readable instructions, as needed, or some instructions may be executed at computing device 142 and some at computing device 160.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of fulfilling requests for content items of a content item set accessible to a content item host having a processor, the method comprising:

executing on the processor instructions that cause the content item host to:

offer respective content items through a first offer comprising a referral from a sponsoring referrer that is providing sponsorship to the content item host for the content item set and, concurrently, a second offer not comprising a referral from a sponsoring referrer; and upon receiving from a requester a request for a content item:
  evaluate the request to determine whether the request comprises a referral by the sponsoring referrer responsive to the first offer;
  for requests that comprise a referral by the sponsoring referral responsive to the first offer, provide a full version of the content item to the requester; and
  for requests responsive to the second offer and that do not comprise a referral from a sponsoring referrer, provide a limited version of the content item to the requester.

2. The method of claim 1:
at least one sponsoring referrer comprising a search engine indexing at least a portion of the content item set;
at least one requester comprising a search engine visitor; and
the first offer comprising: a search engine result referring the content item as a search engine result provided by the search engine to the requester in response to a search query executed on the search engine on behalf of the requester.

3. The method of claim 1, at least two referrers comprising sponsoring referrers.

4. The method of claim 1, the instructions further causing the content item host to establish a sponsorship relationship with a sponsoring referrer by negotiating a sponsorship fee with the sponsoring referrer based on referrals of requests by requesters for at least one content item.

5. The method of claim 1:
at least one referrer comprising a search engine configured to explore the content item set, and
the instructions further causing the content item host to establish a sponsorship relationship with the search engine by notifying the search engine in a search metadata object.

6. The method of claim 1, the instructions further causing the content item host to:
expose a sponsorship establishing interface configured to establish sponsorship relationships with referrers; and
upon receiving through the sponsorship establishing interface from a referrer a request to establish a sponsorship relationship, establish the sponsorship relationship with the referrer.

7. The method of claim 1:
the request received from the requester including a referrer identifier, and
evaluating the request to determine whether the request comprises a referral by the sponsoring referrer responsive to the first offer further comprising: detecting the referrer identifier in the request.

8. The method of claim 1:
the instructions further causing the content item host to, upon detecting a request for at least one content item prompted by a referral from a referrer, provide to the referrer a referrer identifying reference associated with the content item and identifying the referrer; and
evaluating the request to determine whether the request comprises a referral by the sponsoring referrer responsive to the first offer further comprising: detecting the referrer identifying reference received from the requester.

9. The method of claim 1, the instructions further causing the content item host to:
identify the requester as a subscriber of the content item set, and
upon identifying the requester as a subscriber of the content item set, provide a full version of the content item to the requester.

10. The method of claim 1, the instructions further causing the content item host to:
identify the requester as a sponsoring referrer, and
upon identifying the requester as a sponsoring referrer, provide a full version of the content item to the sponsoring referrer.

11. The method of claim 1, the limited version of the content item provided to the requester further comprising at least one content item portion selected from a set of content item portions comprising:
a summary of the content item;
a sample of the content item;
a bibliographic reference to the content item; and
a metadata descriptor of the content item.

12. The method of claim 1, providing the limited version of the content item to the requester further comprising: providing the limited version of the content item with at least one sponsorship item selected from a set of sponsorship items comprising:
a referral to a sponsoring referrer;
an advertisement for a subscription to the content item set; and
an advertisement provided by an advertiser.

13. The method of claim 1, the instructions further causing the content item host to:
record the fulfilling of the request of the requester, and
charge the sponsoring referrer a sponsorship fee based on the content items provided to the requester.

14. The method of claim 13, the sponsorship fee computed according to at least one sponsorship factor selected from a set of sponsorship factors further comprising:
a requested content items metric;
a requester traffic metric; and
a referrer revenue metric associated with revenue received by the sponsoring referrer for referring the requester to the content item.

15. The method of claim 13, the sponsorship fee computed by:
identifying a total sponsorship target, and
computing the sponsorship fee as an allocation of the total sponsorship target over requests for the content items of the content item set.

16. The method of claim 1, providing the full version of the content item to the requester further comprising: informing the requester of the sponsorship relationship with at least one sponsoring referrer.

17. The method of claim 1, the instructions further causing the content item host to, upon receiving from a searcher a search query applicable to the content item set, refer the searcher to at least one sponsoring referrer.

18. The method of claim 1, the instructions further causing the content item host to, upon receiving from a requester a request for a content item set search component, provide to the requester a content item set search component configured to:
identify the content item set and at least one sponsoring referrer, and
refer search queries received from the requester to the at least one sponsoring referrer.

19. A memory device storing instructions that, when executed on a processor of a content item host, cause the processor to fulfill requests for content items of a content item set by:
- offering respective content items through a first offer associated with a sponsoring referrer that is providing sponsorship to the content item host for the content item set and, concurrently, a second offer not associated with a sponsoring referrer; and
- upon receiving from a requester a request for a content item:
  - evaluating the request to determine whether the request comprises a referral by the sponsoring referrer responsive to the first offer;
  - for requests that comprise a referral by the sponsoring referral responsive to the first offer, providing a full version of the content item to the requester; and
  - for requests responsive to the second offer and that do not comprise a referral from a sponsoring referrer, providing a limited version of the content item to the requester.

20. A method of providing a content item library to a set of users on a server having a processor, the method comprising:
- executing on the processor instructions that cause the server to:
  - upon receiving from a search referrer an offer to provide sponsorship to the content item library, identify the search referrer as a sponsoring referrer; and
  - upon receiving from a user a request for a content item:
    - evaluating the request to determine whether the request comprises a referral by a sponsoring referrer responsive to an offer by the sponsoring referrer to provide the content item;
    - upon determining that the request was referred by a sponsoring referrer, provide a full version of the content item in response to the request; and
    - upon determining that the request was not referred by a sponsoring referrer, provide a limited version of the content item in response to the request.

* * * * *